United States Patent
Suzuki (10) Patent No.: US 9,576,701 B2
(45) Date of Patent: Feb. 21, 2017

(54) HIGH-VOLTAGE WIRE WIRING STRUCTURE IN VEHICLE

(71) Applicant: MITSUBISHI JIDOSHA KOGYO KABUSHIKI KAISHA, Tokyo (JP)

(72) Inventor: Akira Suzuki, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/539,870

(22) Filed: Nov. 12, 2014

(65) Prior Publication Data

US 2015/0129275 A1    May 14, 2015

(30) Foreign Application Priority Data

Nov. 13, 2013  (JP) .................................. 2013-234584
Feb. 18, 2014  (JP) .................................. 2014-028338

(51) Int. Cl.
| | |
|---|---|
| *H02G 3/04* | (2006.01) |
| *H01B 7/20* | (2006.01) |
| *B60R 16/02* | (2006.01) |
| *H01B 9/00* | (2006.01) |

(52) U.S. Cl.
CPC ............ *H01B 7/20* (2013.01); *B60R 16/0215* (2013.01); *H01B 9/00* (2013.01); *H02G 3/0406* (2013.01); *Y10S 903/904* (2013.01)

(58) Field of Classification Search
USPC ...................................................... 174/72 A
See application file for complete search history.

(56) References Cited

U.S. PATENT DOCUMENTS

| | | | |
|---|---|---|---|
| 5,668,351 A | 9/1997 | Hanlon et al. | |
| 6,152,433 A | 11/2000 | Hettich et al. | |
| 7,172,042 B2* | 2/2007 | Yamaguchi | B60K 6/48 |
| | | | 180/65.1 |
| 8,525,029 B2 | 9/2013 | Kato et al. | |
| 2001/0003404 A1 | 6/2001 | Shikata et al. | |
| 2011/0031809 A1 | 2/2011 | Yoshida et al. | |
| 2011/0094796 A1* | 4/2011 | Toyama | B60R 16/0207 |
| | | | 174/72 A |
| 2011/0155458 A1 | 6/2011 | Kato et al. | |
| 2013/0284484 A1* | 10/2013 | Toyama | B32B 1/00 |
| | | | 174/68.3 |
| 2014/0216812 A1 | 8/2014 | Adachi et al. | |

(Continued)

FOREIGN PATENT DOCUMENTS

| | | |
|---|---|---|
| CN | 102136706 A | 7/2011 |
| EP | 0 900 675 A2 | 3/1999 |

(Continued)

*Primary Examiner* — Dhirubhai R Patel
(74) *Attorney, Agent, or Firm* — Birch, Stewart, Kolasch & Birch, LLP (57) ABSTRACT

A high-voltage wiring structure in a vehicle includes an extending member extending in an extending direction which is a longitudinal direction or a width direction of the vehicle, a plurality of bulkheads respectively provided at a plurality of portions of the extending member in the extending direction, a high-voltage wire extended from a battery for driving the vehicle, and a pipe, in which the high-voltage wire is inserted, and which is surrounded by the extending member. A plurality of portions of the pipe in a longitudinal direction of the pipe are respectively fixed to the bulkheads by welding.

8 Claims, 9 Drawing Sheets

(56) References Cited

U.S. PATENT DOCUMENTS

2015/0000974 A1    1/2015   Shiga et al.
2015/0179300 A1*   6/2015   Inao .................... B60R 16/0215
                                                                                                       174/68.3

FOREIGN PATENT DOCUMENTS

| EP | 0 900 675 A3 | 3/1999 |
| JP | 2008-296600 A | 12/2008 |
| JP | 2013-47029 A | 3/2013 |
| WO | WO 2013/065808 A1 | 5/2013 |
| WO | WO 2013/125063 A1 | 8/2013 |

* cited by examiner

HIGH-VOLTAGE WIRE WIRING STRUCTURE IN VEHICLE

BACKGROUND

The invention relates to a wiring structure of a high-voltage wire in a vehicle.

In an electric motor vehicle such as a plug-in hybrid vehicle or an electric vehicle, a battery for driving the vehicle serving as a power supply for a traveling motor has a relatively large volume.

Thus, to form a large space within a compartment, in many vehicles, the battery is disposed below a floor or below a baggage room in the rear portion of the vehicle, and an inverter and a traveling motor are disposed in the front or rear space of the vehicle body (see the patent document 1).

And, a high-voltage wire for supplying high-voltage power from the battery to the inverter is wired into the front or rear space of the vehicle body from below of the floor.

In this case, to protect the high-voltage wire against impacts in vehicle collision, an exclusive protection member (protector) is attached to the high-voltage wire, or there is used a high-voltage wire having such high strength as can prevent itself from being cut in collision.

[Patent Document 1] Japanese Patent Publication No. 2013-47029

SUMMARY

According to the advantageous aspect of the invention, there is provided a high-voltage wire wiring structure in a vehicle which can protect a high-voltage wire in vehicle collision and can secure the freedom of the layout of the vehicle, thereby allowing the cost reduction of the high-voltage wire advantageously.

According to one advantageous aspect of the invention, there is provided a high-voltage wiring structure in a vehicle, comprising:

an extending member extending in an extending direction which is a longitudinal direction or a width direction of the vehicle;

a plurality of bulkheads respectively provided at a plurality of portions of the extending member in the extending direction;

a high-voltage wire extended from a battery for driving the vehicle; and a pipe, in which the high-voltage wire is inserted, and which is surrounded by the extending member, wherein a plurality of portions of the pipe in a longitudinal direction of the pipe are respectively fixed to the bulkheads by welding.

The extending member may be formed with an insertion opening through which the pipe is inserted out from a space surrounded by the extending member.

The insertion opening may be situated at rear side than a front end of a strut house of the vehicle.

The insertion opening may be situated at front side than the dash panel of the vehicle.

The bulkheads may extend along the extending direction of the extending member.

The bulkhead may extend in a direction perpendicular to the extending direction of the extending member so as to partition a space between the pipe and extending member.

DETAILED DESCRIPTION OF EXEMPLIFIED EMBODIMENTS

With the conventional technology for attaching the exclusive protection member to the high-voltage wire, the high-voltage wire cannot be protected sufficiently in vehicle collision and also, in order to secure the space for wiring the high-voltage wire, the freedom of the layout of the vehicle is limited. Also, in the case of a high-strength high-voltage wire, in order to secure the high-voltage wire wiring space, the freedom of the vehicle layout is limited and the cost of the high-voltage wire is increased.

The invention provides a high-voltage wire wiring structure for use in a vehicle which, while protecting a high-voltage wire in vehicle collision, can secure the freedom of the vehicle layout and can advantageously reduce the cost of the high-voltage wire.

Figure 1:
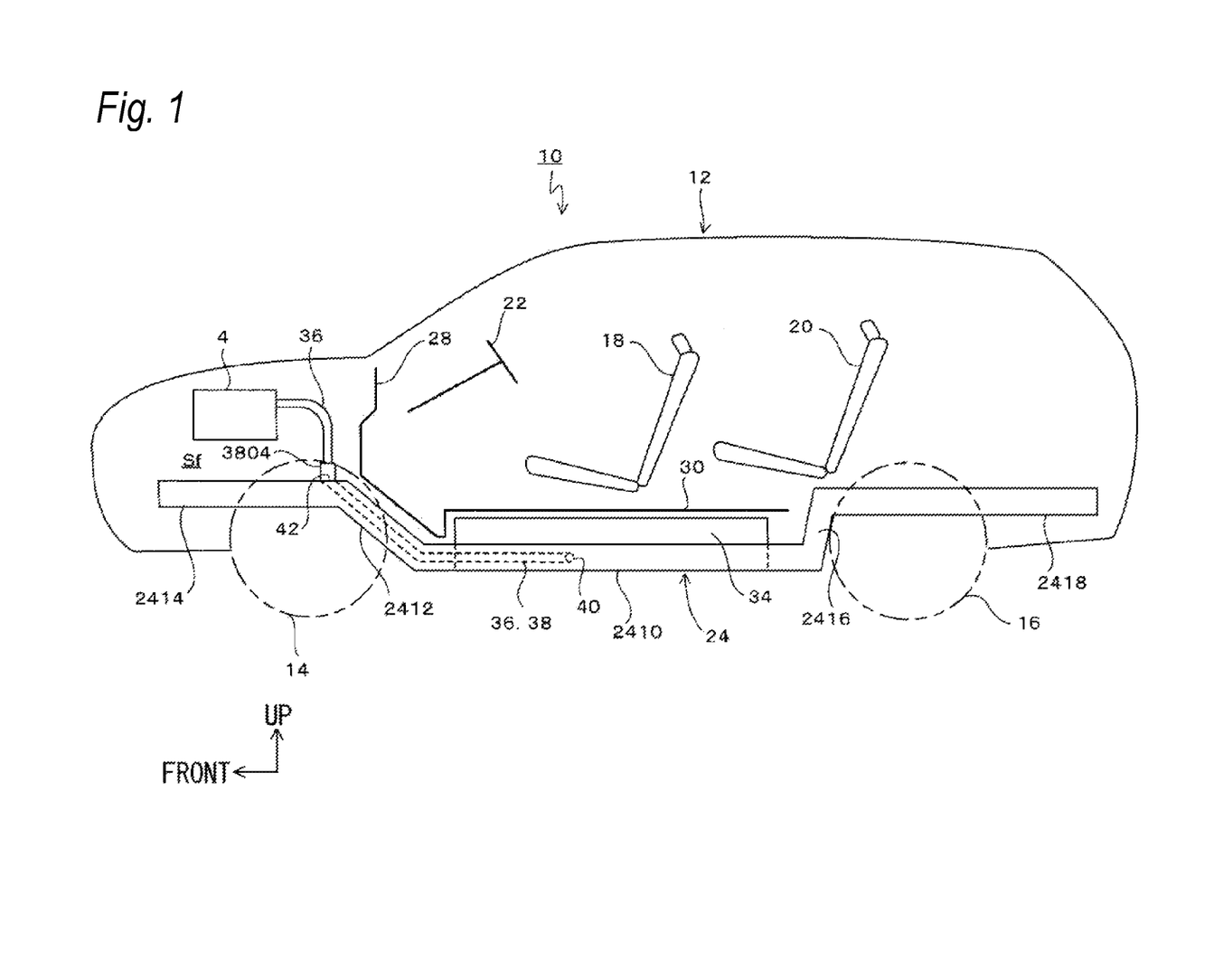
FIG. 1 is schematic side view of a vehicle incorporating therein a high-voltage wire wiring structure according to a first embodiment.
Figure 2:
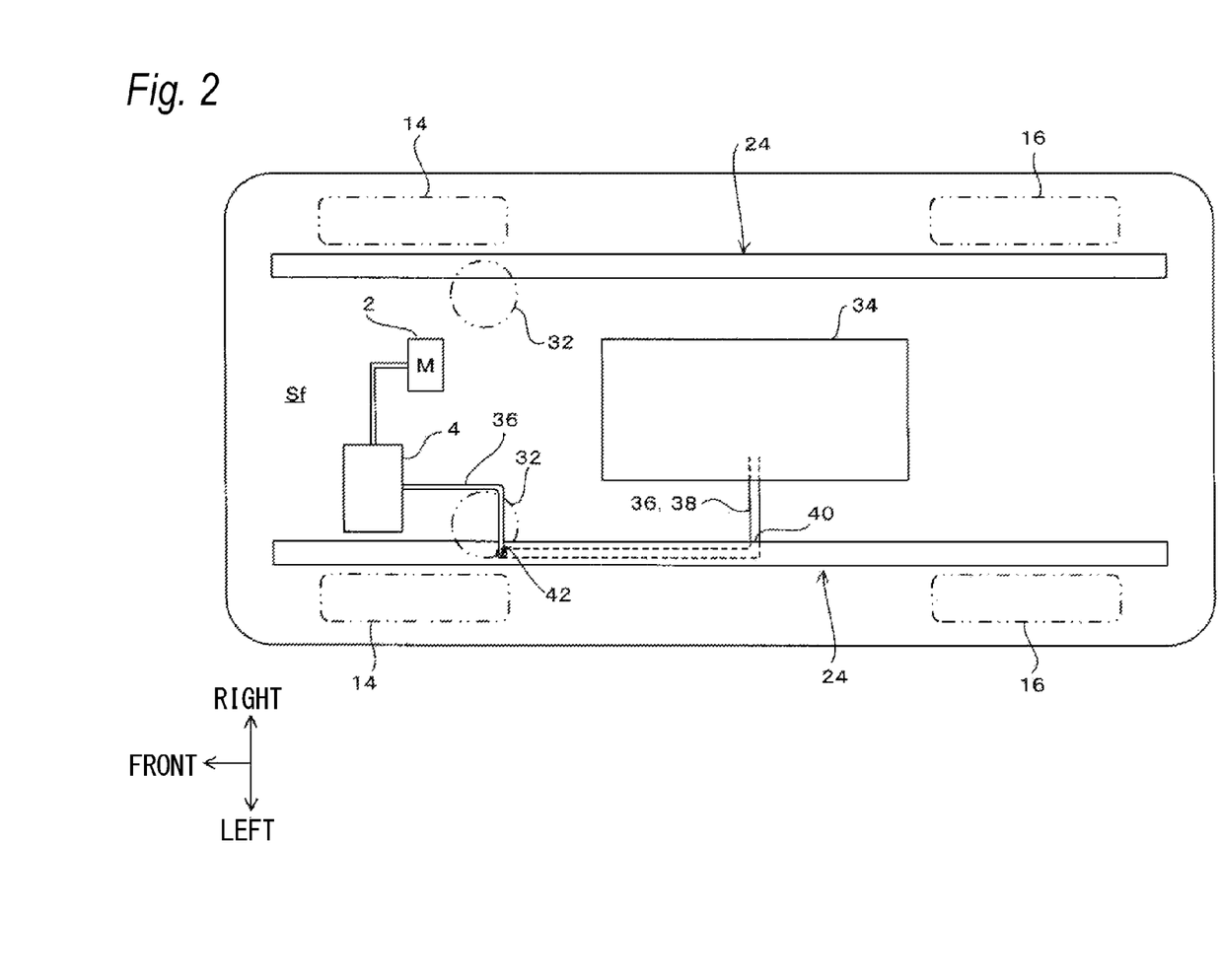
FIG. 2 is a schematic plan view of the vehicle incorporating therein the high-voltage wire wiring structure of the first embodiment.

Firstly, description is given of the structure of a vehicle 10 to which an embodiment of the invention with reference to FIGS. 1 and 2 is applied.

The vehicle 10 of the embodiment is a plug-in hybrid vehicle using both of an engine and a traveling motor as its drive source. Here, the invention can be widely applied, besides the plug-in hybrid vehicle, to an electrically-operated vehicle such as an electric vehicle using a motor as its drive source and a hybrid vehicle using both of an engine and a motor as its drive source.

In FIGS. 1 and 2, a reference numeral 12 designates a vehicle body, a reference numeral 14 designates front wheels, a reference numeral 16 designates rear wheels, a reference numeral 18 designates a front seat, a reference numeral 20 designates a rear seat, and a reference numeral 22 designates a steering wheel, respectively.

The vehicle body 12 includes a pair of side members 24 extending in the longitudinal direction of the vehicle 10 with a clearance in the vehicle width direction between them. The side member 24 is an extending member extending in the longitudinal direction of the vehicle 10.

Figure 8:
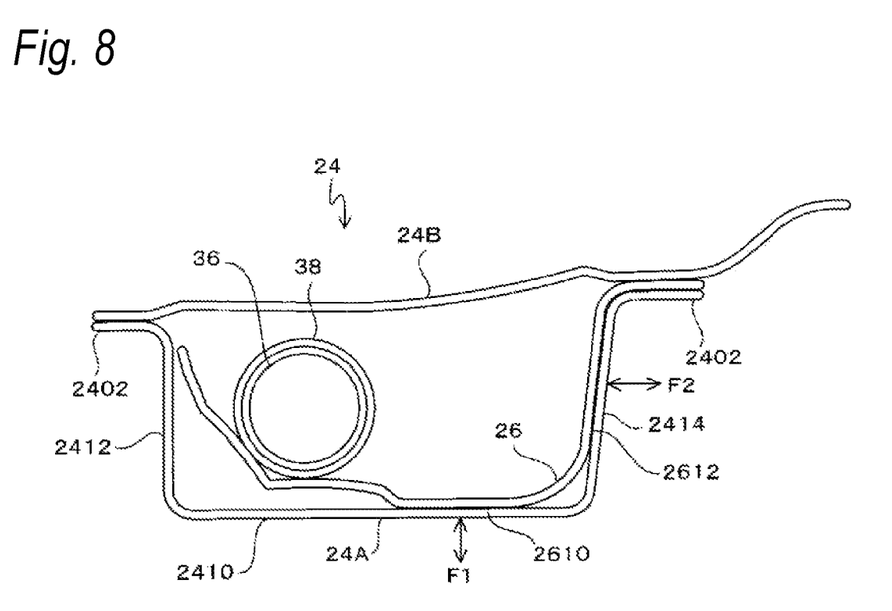
FIG. 8 is a section view taken along the B-B line of FIG. 4.

As shown in FIG. 8, the side member 24 includes a lower part 24A formed opened upward and having two flange portions respectively on either side in its width direction and an upper part 24B to be welded to the two-side flange portions 2402 of the lower part 24A, while the side member has a closed section structure. Here, the side member 24 may also have an open section structure, while the invention can be applied to both of the closed and open section structures of the side member 24.

As shown in FIGS. 4, 5, 7 and 8, to the longitudinally-spaced multiple portions of the side member 24, there are fixed by welding bulkheads 26 functioning as parts for reinforcing the side member 24, thereby enhancing the rigidity thereof.

Here, in this specification, the bulkhead means a reinforcing part for reinforcing the strength of a closed or open section structure against compression force or tensile force. In this embodiment, the bulkhead 26 functions as a reinforcing part for reinforcing the strength of the side member 24 against compression force or tensile force applied thereto from a direction perpendicular to the longitudinal direction thereof.

In this embodiment, the bulkheads 26 are formed to extend along the extending direction of the side member 24 and are fixed by welding to the mutually longitudinally spaced multiple portions of the inside surfaces of the lower part 24A.

More specifically, as shown in FIG. 8, the lower part 24A has a bottom wall 2410 and two side walls 2412, 2414 respectively rising from the two sides of the bottom wall 2410 and connectable to two side flanges 2402.

The bulkheads 26 are welded to the bottom wall 2410 of the side member 24 and to one-side side wall 2414 at the multiple longitudinally-spaced portions of the side member 24. In the drawings, reference numerals 2610 and 2612 designate the welded portions respectively.

Therefore, the bulkheads 26 function as reinforcing parts for reinforcing the strength of the side member 24 against compression force or tensile force respectively designated by reference signs F1 and F2.

As shown in FIG. 1, dash panels 28 for separating the front space Sf of the vehicle body 12 from the vehicle compartment are provided in the near-to-front portions of the paired side members 24members 24 and, floor panels 30 are provided backwardly of the rear ends of the dash panels 28.

In the front space Sf of the vehicle body 12, there are provided parts constituting the steering system, braking system, power transmission system and air conditioning system of the vehicle 10 including an engine, a traveling motor 2 and an inverter 4. The inverter 4 corresponds to a power receiving part for receiving the power of a battery 34.

As shown in FIG. 2, in the near-to-front portions of the vehicle body 12, there are provided a pair of a tubular-shaped (turret-shaped) strut houses 32 spaced in the vehicle-width direction from each other for supporting the suspension devices of the front wheels 14.

As shown in FIGS. 1 and 2, the battery 34 is provided below the floor panel 30 between the paired side members 24.

The battery 34 has a flat rectangular parallelpiped shape and is mounted between the paired side members 24 through a mounting part (not shown).

The battery 34 has a high-voltage wire 36 extended from one side in the vehicle-width direction and supplies high-voltage dc power through the high-voltage wire 36 to the inverter 4. The high-voltage dc power is converted to three-phase ac power by the inverter 4 and is supplied to the traveling motor 2, thereby driving the traveling motor 2.

Next, description is given of a structure for wiring a high-voltage wire according to a first embodiment.

In the high-voltage wire wiring structure of this embodiment, the high-voltage wire 36 is inserted into a metal pipe (pipe) 38, while the metal pipe 38 with the high-voltage wire 36 inserted therein is wired using the side members 24 and bulkheads 26.

Specifically describing, as shown in FIG. 1, the side member 24 includes an intermediate part 2410, a front part 2414 and a rear part 2418. The intermediate part 2410 is situated below the compartment midway in the longitudinal direction of the vehicle 10. The front part 2414 is connected to the front end of the intermediate part 2410 through a bent part 2412 and extends in the longitudinal direction at a higher position than the intermediate part 2410. The rear part 2418 is connected to the rear end of the intermediate part 2410 through a bent part 2416 and extends in the longitudinal direction at a higher position than the intermediate part 2410.

Figure 7:
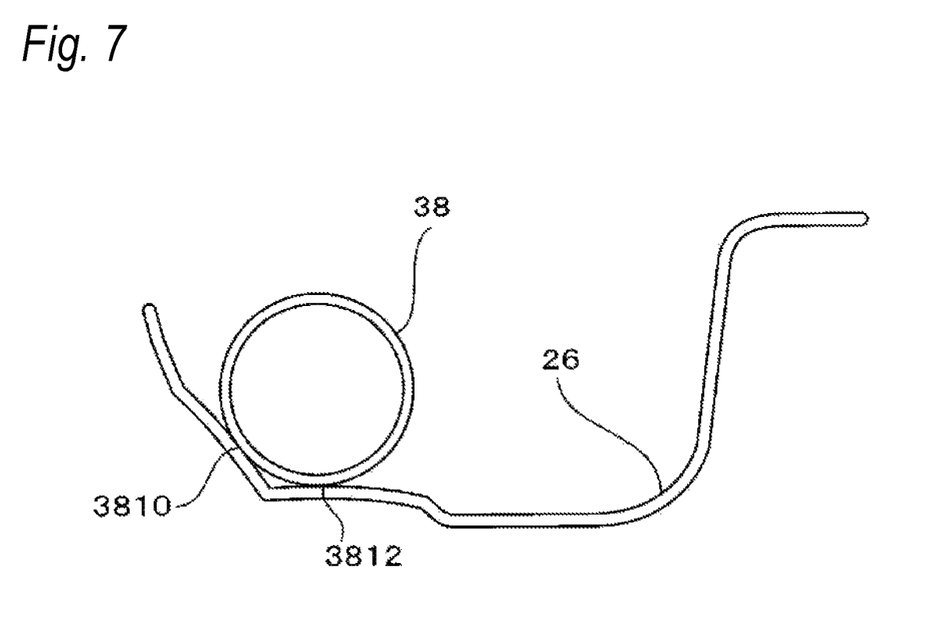
FIG. 7 is a section view taken along the A-A line of FIG. 5.

As shown in FIG. 8, the high-voltage wire 36 is inserted into the metal pipe 38, and the multiple longitudinally-spaced portions of the metal pipe 38 having the high-voltage wire 36 are welded to the bulkheads 26; and, the metal pipe 38 is surrounded by the side members 24 and is disposed with its longitudinal direction extending along the longitudinal direction of the side members 24. In FIG. 7, reference numerals 3810 and 3812 respectively designate welded portions between the metal pipe 38 and bulkheads 26.

More specifically, the metal pipe 38 having the high-voltage wire 36, as shown in FIG. 1, is wired such that it passes through the bent part 2412 of the side member 24 and extends from the rear end of the front part 2414 to the near-to-front portion of the intermediate part 2410.

Figure 3:
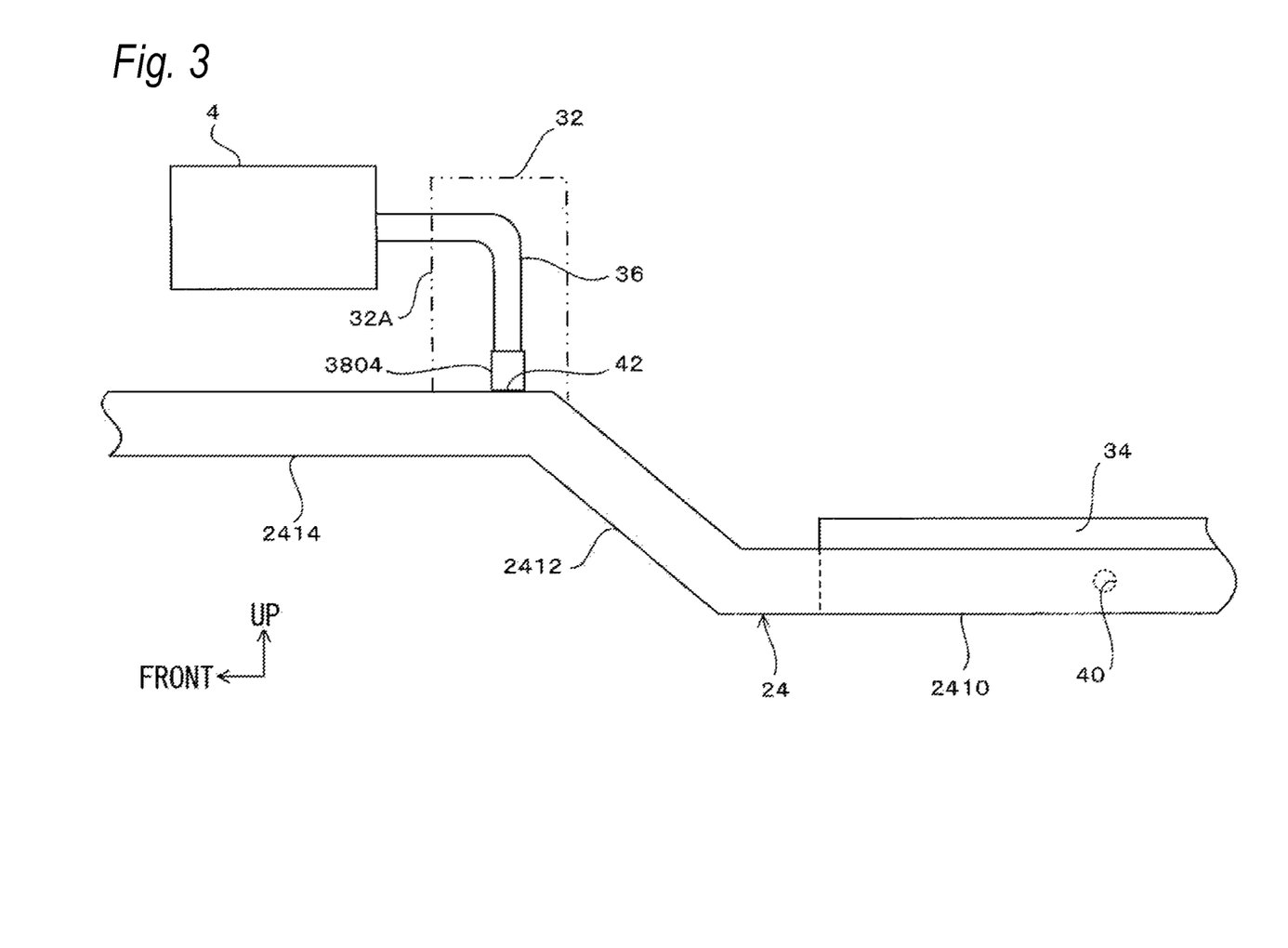
FIG. 3 is a side view of the high-voltage wire wiring structure of the first embodiment.
Figure 4:
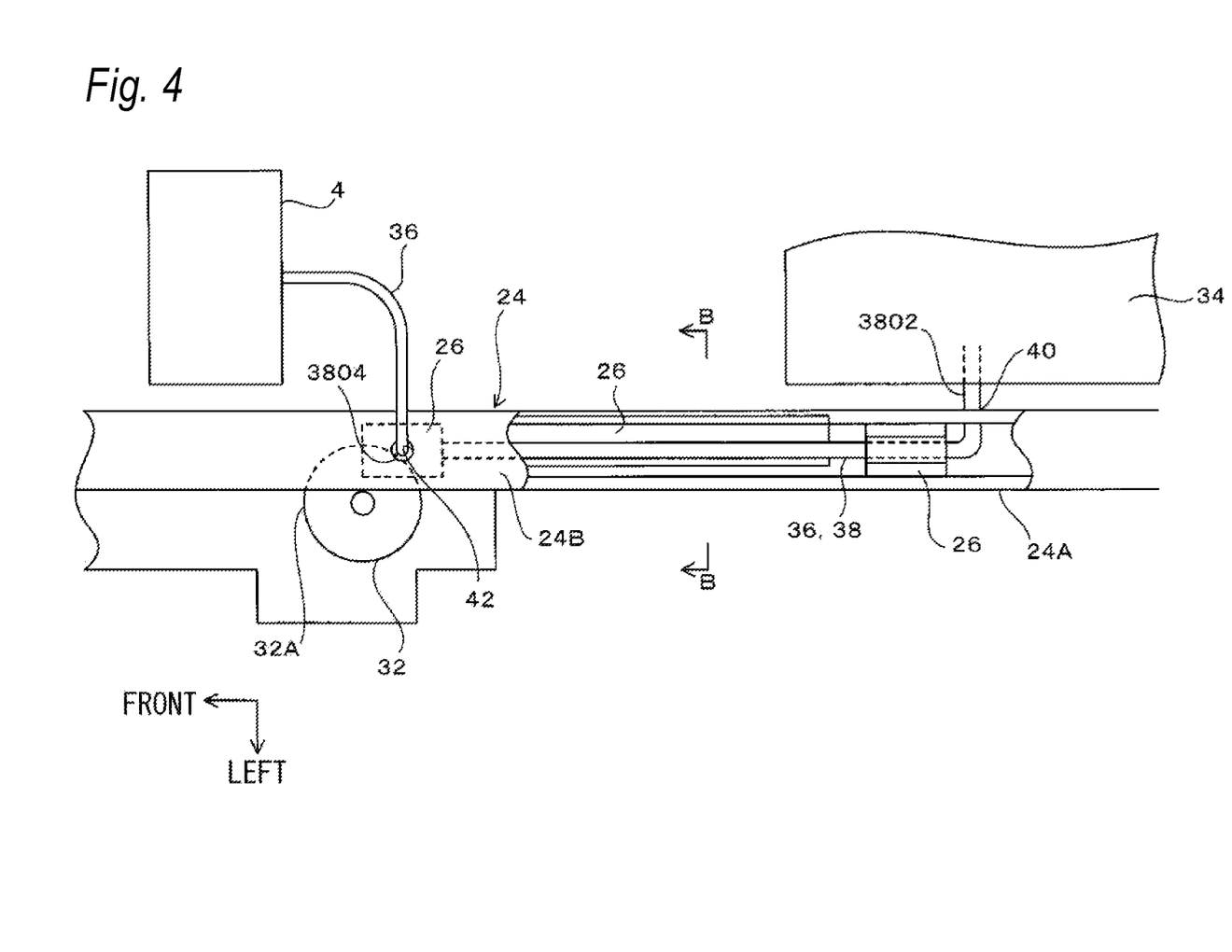
FIG. 4 is a plan view of the high-voltage wire wiring structure of the first embodiment.
Figure 5:
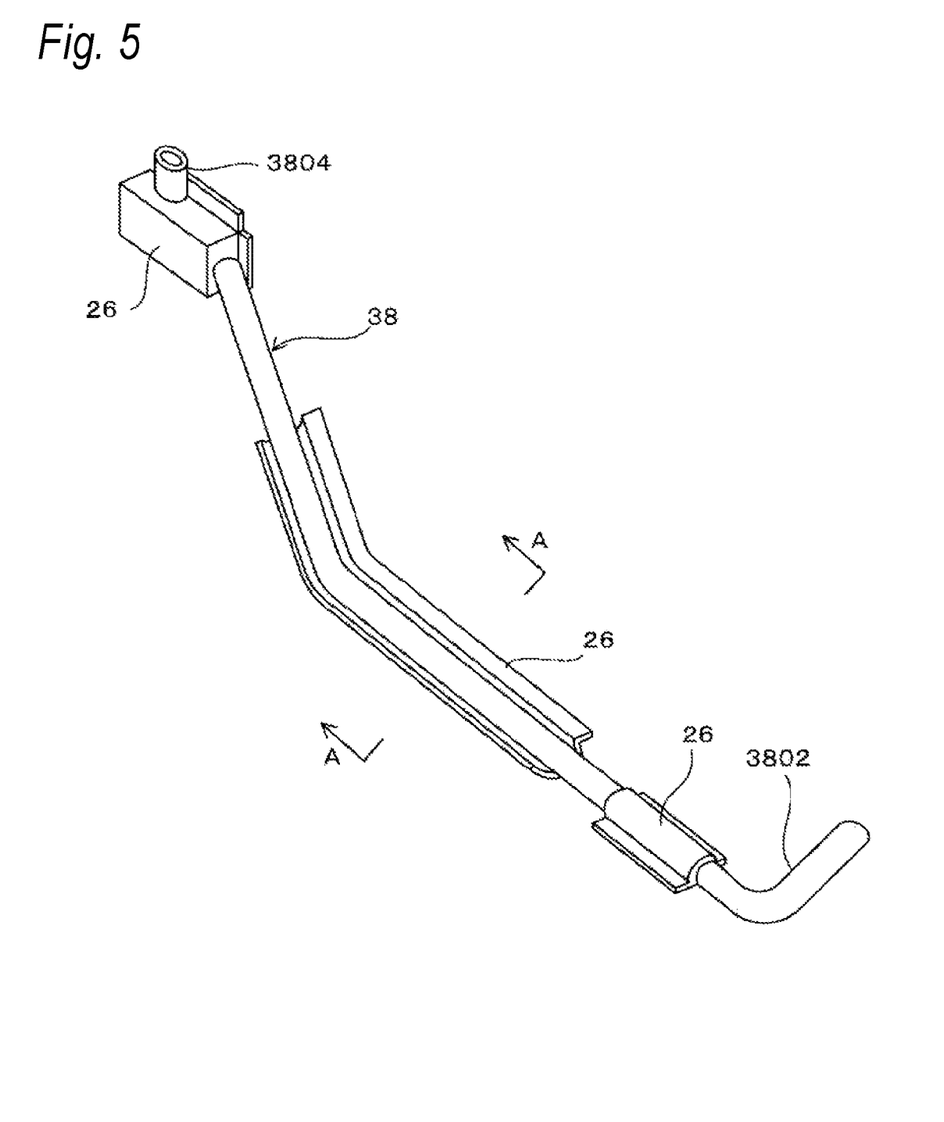
FIG. 5 is a perspective view of a metal pipe with bulkheads fixed thereto.

As shown in FIGS. 3 and 4, the side member 24 has a first insertion opening 40 and a second insertion opening 42 through which the metal pipe 38 having the high-voltage wire 36 can be inserted from outside a space (internal space) surrounded by the side member 24 to inside this space, or, from inside the space to outside the space.

The formation of the first and second insertion openings 40 and 42 can advantageously facilitate the wiring of the metal pipe 38 having the high-voltage wire 36 on the side member 24.

This also enables the high-voltage wire 36 together with the side member 24 to be guided from the space surrounded by the side member 24 to outside the space, thereby allowing the protection of the high-voltage wire 36 advantageously. In other words, the high-voltage wire 36, together with the metal pile 38, can be protruded from the first and second insertion openings 40 and 42 outwardly of the side members 24. Such protrusion of the metal pipe 38 can advantageously protect the high-voltage wire 36 situated outside the side members 24.

The first insertion opening 40 is formed to penetrate through such portion of the lower member 24A as is opposed to the side portion of the battery 34 from which the high-voltage wire 36 is extended.

One end 3802 of the metal pipe 38 in the longitudinal direction is protruded laterally of the side member 24 from the first insertion opening 40 and is inserted into the cover of the battery 34, while the end of the high-voltage wire 36 protruded from one end 3802 is electrically connected to the battery 34.

The second insertion opening 42 is formed to penetrate through such portion of the upper part 24B as is situated near the inverter 4.

Figure 6:
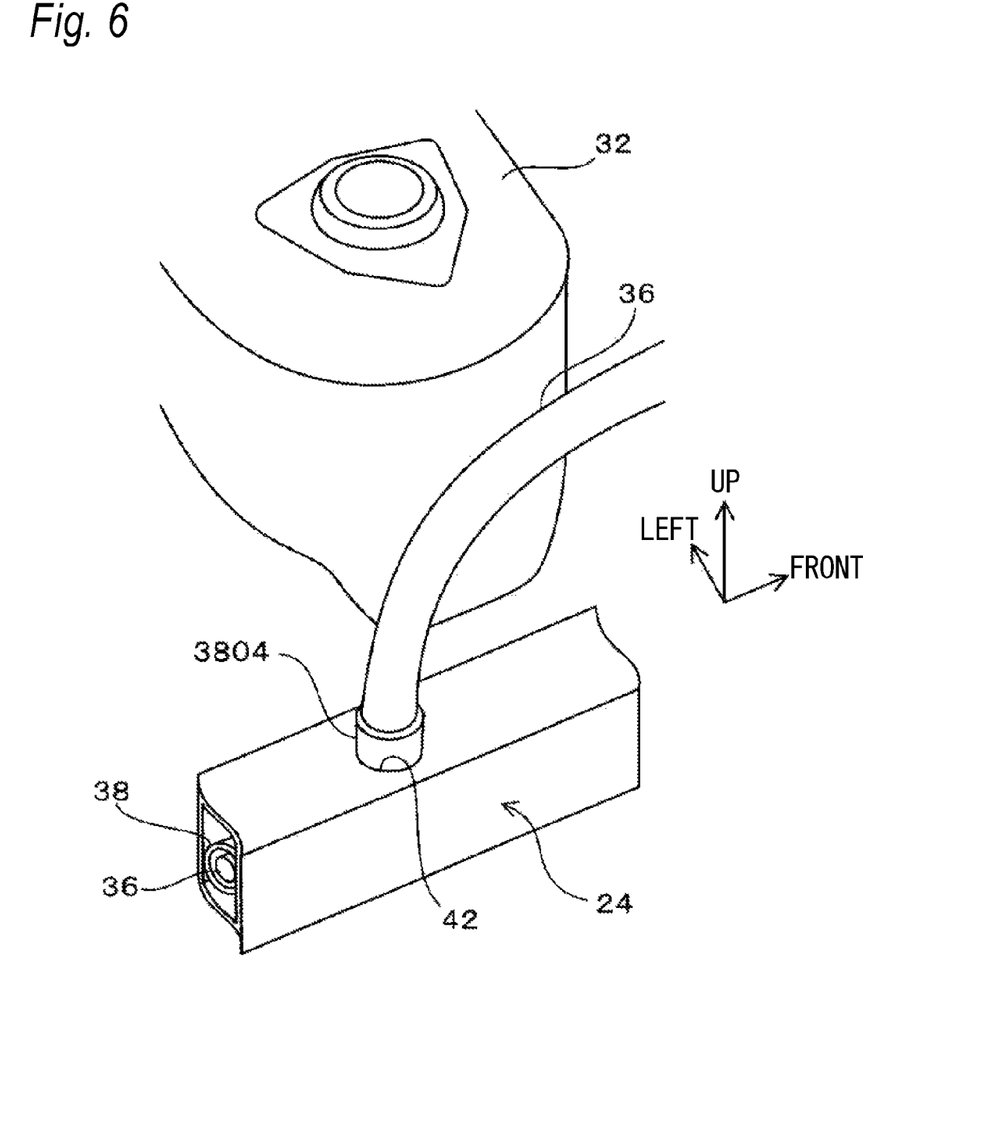
FIG. 6 is a perspective view of a portion of the high-voltage wire wiring structure of the first embodiment.

As shown in FIG. 6, the other end 3804 of the metal pipe 38 in the longitudinal direction is protruded upwardly of the side member 24 from the second insertion opening 42, while the end of the high-voltage wire 36 protruded from the other end 3804 is electrically connected to the inverter 4.

As shown in FIGS. 3 and 4, the second insertion opening 42 is situated more backward than the front end 32A of the strut house 32.

Here, such portion of the vehicle body 12 as is situated forwardly of the strut house 32 in the longitudinal direction of the vehicle 10 is crushed by a collision load input from the front of the vehicle body 12 to thereby constitute an energy absorbing area for absorbing the collision load effectively.

On the other hand, the strut house 32 is shifted backwardly of the energy absorbing area and, in order to support the suspension device, it is enhanced in rigidity. And, such portion of the vehicle body 12 as is situated behind the strut house 32, in order to protect an occupant in the compartment, is higher in rigidity than the energy absorbing area.

Therefore, the second insertion opening 42 situated behind the front end portion 32A of the strut house 32 is protected by the high rigidity portion of the vehicle body 12 hard to crush in collision, thereby allowing the protection of the high-voltage wire 36 in the collision of the vehicle 10 advantageously.

Also, in this embodiment, as shown in FIG. 1, the second insertion opening 42 is situated in front of the dash panel 28 of the vehicle 10.

Thus, when the second insertion opening 42 and inverter 4 disposed in the front space Sf of the vehicle body 12 are made to come near each other, as shown in FIGS. 3 and 4, the portion of the high-voltage wire 36 exposed from the end 3804 of the metal pipe 38 can be shortened, thereby allowing the protection of the high-voltage wire 36 in the collision of the vehicle 10 advantageously.

Thus, using the side members 24 and bulkheads 26, the metal pipe 38 having the high-voltage wire 36 intervenes between the battery 34 and inverter 4.

Therefore, the multiple portions of at least a part of the metal pipe 38 in the longitudinal direction are welded to the bulkheads 26, while the metal pipe 38 is surrounded by the side members 24 and its longitudinal direction is set along the longitudinal direction of the side members 24.

In wiring the high-voltage wire 36, it may be previously inserted into the metal pipe 38 and the metal pipe 38 having the high-voltage wire 36 may be mounted onto the side members 24 through the bulkheads 26.

Or, after the metal pipe 38 is previously mounted on the side members 24 through the bulkheads 26, the high-voltage wire 36 may be inserted into the metal pipe 38.

In the case that the high-voltage wire 36 is inserted into the metal pipe 38 after the metal pipe 38 is mounted on the side members 24 through the bulkheads 26, the metal pipe 38 forms the wiring space for the high-voltage wire 36. Therefore, by a simple operation to insert the high-voltage wire 36 into the metal pipe 38, the high-voltage wire 36 can be wired or replaced, thereby being able to advantageously enhance the efficiency of such wiring or replacing operation.

Further, the metal pipe 38 has the ends 3802 and 3804 respectively protruding from the first and second insertion openings 40 and 42. This can enhance the efficiency of the wiring or replacing operation of the high-voltage wire 36 more advantageously.

In this embodiment, the longitudinal-direction multiple portions of the metal pipe 38 having the high-voltage wire 36 are welded to the bulkheads 26, whereby the metal pipe 38 is surrounded by the side members 24.

Thus, in the collision of the vehicle 10, the high-voltage wire 36 is protected by the metal pipe 38 and also by both the bulkheads 26 and side members 24. This embodiment is thus far more advantageous in protecting the high-voltage wire 36 when compared with a case where, as in the prior art, a protection member is attached to the high-voltage wire 36 simply or a high-strength high-voltage wire 36 is used.

Also, the high-voltage wire 36 is wired using a dead space, that is, the interior of the side member 24. This can reduce the wiring space of the high-voltage wire 36, which provides an advantage in securing the freedom of the layout of the vehicle 10.

And, the high-voltage wire 36 is protected by the metal pipe 38 and also by both the bulkheads 26 and side members 24. This can eliminate the use of an expensive high-strength high-voltage wire 36 as the high-voltage wire 36, which provides an advantage in reducing the cost of the high-voltage wire 36.

Next, description is given of a second embodiment.

The second embodiment is different from the first embodiment in the shape and arrangement of bulkheads but is similar to the first embodiment in remaining structures. Here, in the following embodiment, the same portions and members as in the first embodiment are given the same designations and the description thereof is omitted, while description is given mainly of the different portions.

Figure 9:
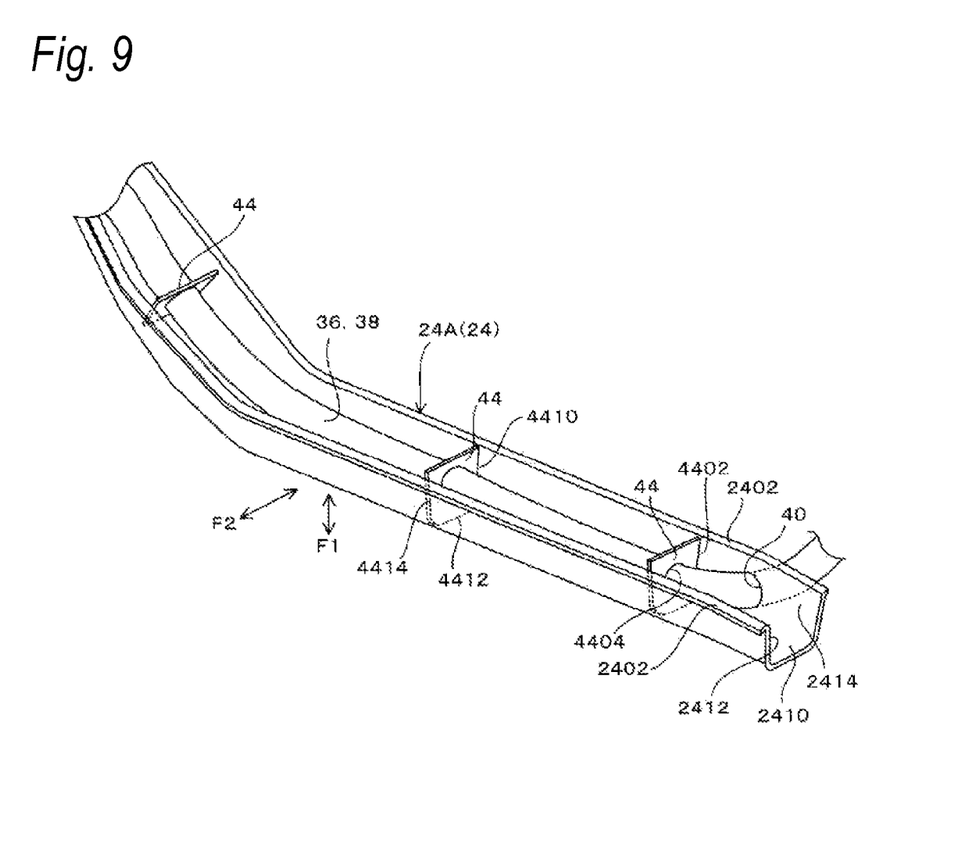
FIG. 9 is a perspective view of main portions of a high-voltage wire wiring structure according to a second embodiment.

FIG. 9 is a perspective view of main portions of a high-voltage wire wiring structure of the second embodiment, wherein, of a side member 24, only a lower part 24A is shown while the illustration of an upper part 24B is omitted.

Bulkheads 44 are fixed by welding to the multiple longitudinally-spaced portions of the side member 24 and function as parts for reinforcing the side members 24, thereby enhancing the rigidity of the side members 24.

Each bulkhead 44 is made of a steel-made plate material. The bulkhead 44 extends in a direction perpendicular to the extending direction of the side member 24 so as to partition a space between the metal pipe 38 and side member 24. In other words, the bulkhead 44 constitutes a partition wall to partition the space of the side member 24 surrounding the metal pipe 38.

More specifically, each bulkhead 44 has a contour following the section shape of the inner surfaces of the lower and upper parts 24A and 24B, and its outer peripheral edge 4402 is welded to the bottom wall 2410 and side walls 2412 and 2414 of the lower part 24A. In FIG. 9, reference numerals 4410, 4412 and 4414 designate the welded portions respectively.

Therefore, the bulkhead 44, with its outer peripheral edge 4402 welded to the inner surfaces of the lower part 24A, functions as a part for reinforcing the strength of the side member 24 against compression force or tensile force shown by designations F1 and F2.

Each bulkhead 44 has an insertion hole 4404 through which the metal pipe 38 having the high-voltage wire 36 can be inserted.

The outer peripheral surface of the metal pipe 38 inserted through the insertion holes 4404 and the edges of the insertion holes 4404 are welded together, whereby the multiple portions of the metal pipe 38 are welded to the bulkheads 44.

In the second embodiment as well, there can be provided similar operation effects to the first embodiment.

Here, in this embodiment, description has been given of a case where extending members for covering the metal pipe 38 with the high-voltage wire 36 inserted therein are the side members 24 extending in the longitudinal direction of the vehicle 10.

However, the extending member is not limited to the side member 24 but it may also be, for example, a side sill extending in the longitudinal direction of the vehicle 10 and including bulkheads 26 respectively provided in the extending-direction multiple portions thereof, or a cross member extending in the right-and-left direction of the vehicle 10 and including bulkheads 26 respectively provided in the extending-direction multiple portions thereof.

In the case that the extending member is a member to form the skeleton member of the vehicle body 12 such as a side member 24 or cross member, the high-voltage wire 36 can be more advantageously protected in the collision of the vehicle 10.

The power receiving part to be connected to the battery 34 through the high-voltage wire need only be capable of receiving the power of the battery 34 and thus it is not limited to the inverter 4.

Here, although the metal pipe 38 is shown as an example of a pipe, the material of the pipe is not limited to the metal but any other material can be used so long as it has a specific strength and can be welded to the bulkhead 26.

According to the invention, since, in vehicle collision, the high-voltage wire is protected by the pipe and also by both the bulkheads and extending members, the high-voltage wire can be protected advantageously.

Since the high-voltage wire is wired using a dead space, that is, the interior of the extending member, the wiring space of the high-voltage wire can be reduced and thus the freedom of vehicle layout can be secured advantageously.

Since the high-voltage wire is protected by the pipe and also by both the bulkheads and extending members, an expensive high-strength high-voltage wire need not be used as the high-voltage wire, thereby allowing the cost reduction of the high-voltage wire advantageously.

According to the invention, the high-voltage wire can be guided together with the pipe from within a space surrounded by the extending members to outside such space, thereby allowing the protection of the high-voltage wire more advantageously.

According to the invention, since the insertion opening is protected by the high-rigidity portion of the vehicle body hard to be crushed in collision, in vehicle collision, the high-voltage wire can be protected advantageously.

According to the invention, in the case that the power receiving part for receiving the power of the battery is disposed in the vehicle body front space existing before the dash panel, the distance between the power receiving part and insertion opening can be shortened. This can shorten the portion of the high-voltage wire exposed from the end of the pipe, thereby allowing the protection of the high-voltage wire advantageously.

According to the invention, regardless of the shape of the bulkheads, the high-voltage wire can be protected advantageously.

What is claimed is:

1. A high-voltage wiring structure in a vehicle, comprising:
    an extending member being a skeleton member of the vehicle and extending in an extending direction which is a longitudinal direction or a width direction of the vehicle;
    a plurality of bulkheads respectively provided in an inside surface of the extending member at a plurality of portions mutually spaced in the extending direction;
    a high-voltage wire extended from a battery for driving the vehicle; and
    a pipe, in which the high-voltage wire that supplies electric power to a component of the vehicle is inserted, and which is surrounded by the inside surface of the extending member,
    wherein a plurality of portions of the pipe in a longitudinal direction of the pipe are respectively fixed to the bulkheads by welding.

2. The high-voltage wiring structure according to claim 1, wherein
    the extending member is formed with an insertion opening through which the pipe protrudes from a space surrounded by the extending member.

3. The high-voltage wiring structure according to claim 2, wherein
    the insertion opening is situated at rear side than a front end of a strut house of the vehicle.

4. The high-voltage wiring structure according to claim 2, wherein
    the insertion opening is situated at front side than the dash panel of the vehicle.

5. The high-voltage wiring structure according to claim 2, wherein
    the insertion opening is formed at a position directly opposing the battery.

6. The high-voltage wiring structure according to claim 5, wherein
    an end of the pipe that protrudes from the insertion opening is inserted into a cover that accommodates the battery.

7. The high-voltage wiring structure according to claim 1, wherein
    the bulkheads extend along the extending direction of the extending member.

8. The high-voltage wiring structure according to claim 1, wherein
    the bulkheads extend in a direction perpendicular to the extending direction of the extending member so as to partition a space between the pipe and extending member.

* * * * *